US006658934B1

(12) United States Patent
Housey et al.

(10) Patent No.: US 6,658,934 B1
(45) Date of Patent: Dec. 9, 2003

(54) LIQUID LEVEL SENDER ASSEMBLY

(75) Inventors: Randal L. Housey, Austin, TX (US);
Will Pattison, Plano, TX (US);
Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

(21) Appl. No.: 09/937,029

(22) PCT Filed: Mar. 22, 2000

(86) PCT No.: PCT/US00/07668
§ 371 (c)(1),
(2), (4) Date: Dec. 4, 2001

(87) PCT Pub. No.: WO00/60321
PCT Pub. Date: Oct. 12, 2000

Related U.S. Application Data

(60) Provisional application No. 60/127,309, filed on Apr. 1, 1999.

(51) Int. Cl.[7] ................................................ G01F 23/32
(52) U.S. Cl. ...................... 73/317; 73/290 R; 73/305; 73/314
(58) Field of Search ......................... 73/305, 314, 317, 73/290 R

(56) References Cited

U.S. PATENT DOCUMENTS

| 23,816 A | 5/1859 | Andrews et al. | |
|---|---|---|---|
| 2,198,055 A | 4/1940 | Liner ........................... | 73/313 |
| 4,532,491 A | 7/1985 | Rau et al. ...................... | 338/33 |
| 4,924,704 A | 5/1990 | Gaston ........................ | 73/317 |
| 5,341,679 A * | 8/1994 | Walkowski et al. ............ | 73/317 |
| 5,743,136 A | 4/1998 | Gaston et al. ................. | 73/313 |
| 6,305,220 B1 * | 10/2001 | Brunel ........................ | 73/317 |

FOREIGN PATENT DOCUMENTS

| DE | 43 00 383 A1 | 7/1994 | |
|---|---|---|---|
| DE | 197 46 276 A1 | 4/1999 | |
| DE | 197 54 521 A1 | 6/1999 | |
| EP | 0 895 068 A2 | 2/1999 | |
| FR | 2 661 498 A1 | 10/1991 | |
| GB | 2270759 A * | 3/1994 | ........... G01F/23/36 |

* cited by examiner

Primary Examiner—Hezron Williams
Assistant Examiner—Rodney Frank
(74) Attorney, Agent, or Firm—Sidley Austin Brown & Wood LLP

(57) ABSTRACT

A liquid level sender assembly constructed to minimize contact distortion and dither. A housing supports a resistive track and a pivot arm is connected to the housing. The pivot arm has a force transmitting member attached which interacts with a boss on a contact carrier which is also pivotably attached to the case. A space is provided in the fit of boss within the force transmitting member which allows the boss to remain in one position when the pivot arm vibrates in small oscillations, but causes the boss to move in response to larger movements of the pivot arm. Contacts on the contact assembly electrically cooperate with the resistive track to provide a variable resistor. The contact carrier receives only force components directed circumferentially about the axis.

21 Claims, 5 Drawing Sheets

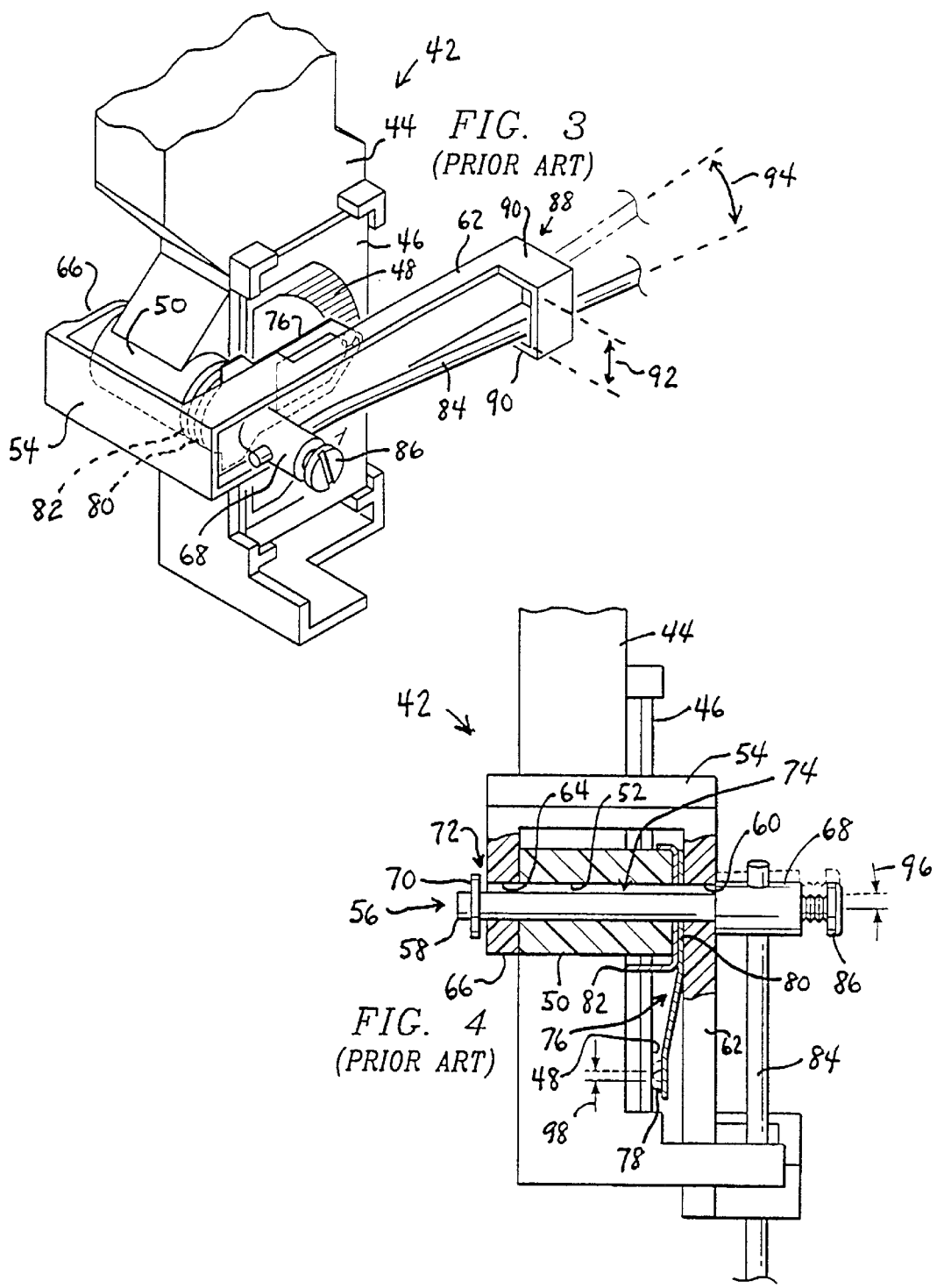

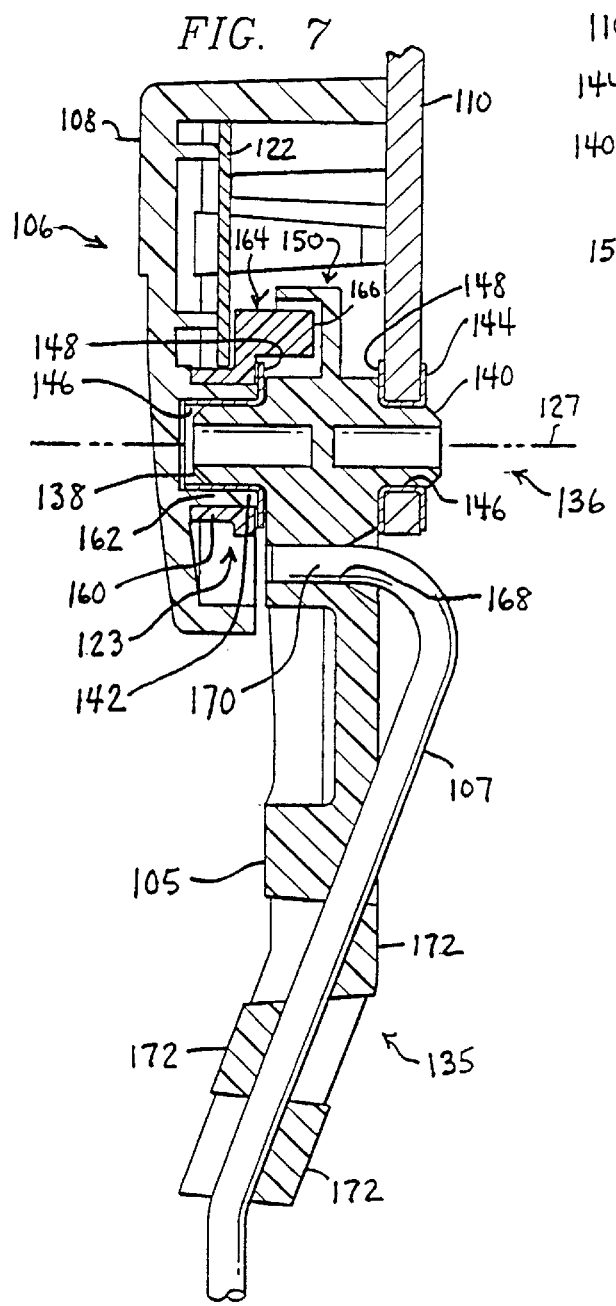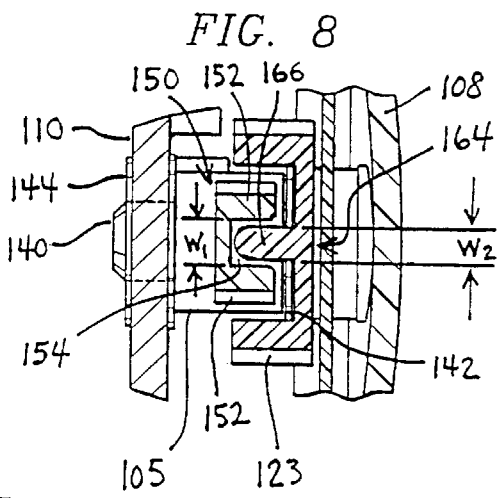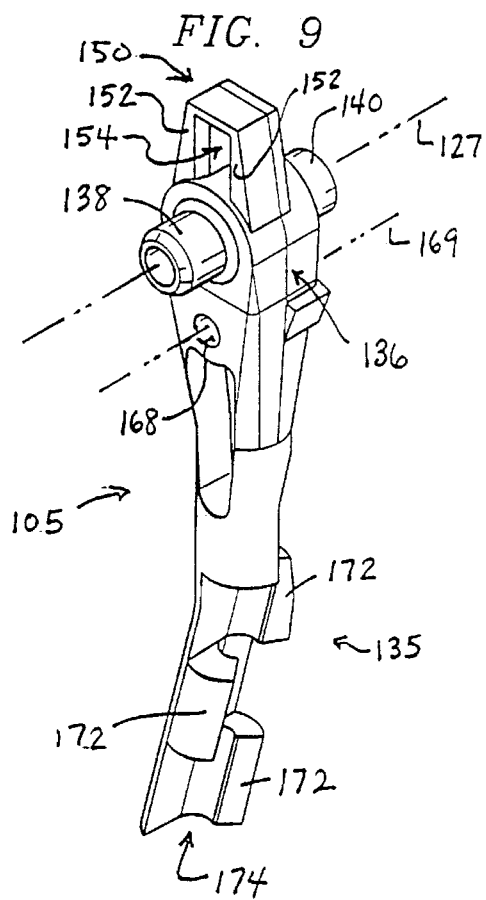

LIQUID LEVEL SENDER ASSEMBLY

CROSS REFERENCE TO RELATED APPLICATIONS

This application claims the benefit of U.S. Provisional Application No. 60/127,309, filed April 1, 1999.

TECHNICAL FIELD OF THE INVENTION

This invention relates to a liquid level sender assembly for a float operated liquid level sensor. In one aspect, it relates to a liquid level sender assembly for monitoring the level of fuel in the fuel tank of a motor vehicle.

BACKGROUND OF THE INVENTION

It is well known to measure the level of liquid in a tank using a sensor having a pivotable float which controls the movement of a wiper contact over a resistive track. Electrical connections to the wiper contact and the resistive track produce an electrical circuit having a variable resistance which corresponds to the position of the float. As the float moves in accordance with the level of liquid in the tank, the resistance of the circuit can be electrically sensed to provide an indication of the liquid level. The portion of the sensor incorporating the resistance track and wiper contact is commonly known as a sending unit or sender assembly. The sender assembly typically does not include a float or float arm but is adapted for the subsequent connection of such items.

Liquid level sender assemblies of the type described above are widely used to measure fuel levels in motor vehicles including cars, trucks, buses, and boats. However, despite their widespread use, prior art sender assemblies are subject to several disadvantages. Two of the most significant disadvantages are float-arm-induced contact distortion and contact dither, as further explained below.

Float-arm-induced contact distortion occurs when side forces on the float arm caused by sloshing fuel, vehicle acceleration, gravity and the like are transmitted from the float arm to the wiper contact, causing the wiper contact to distort and change the contact force exerted on the resistive track. It is known that changes in the contact force, i.e., the normal force exerted by the wiper contact pressing against the resistive track, can produce unwanted changes in the resistance output of the sender assembly circuit. Therefore, in order to provide an accurate liquid level reading, it is desirable for a sender assembly to maintain constant contact force as the float arm moves, despite external loads on the float arm.

Contact dither (i.e., trembling) occurs when the wiper contact oscillates for a prolonged period at low amplitude about a single point on the resistive track. Dither is frequently caused by vibrating fuel which causes the float arm to oscillate at a single fuel level (e.g., during transportation of the vehicle on a trailer). Contact dither can cause abnormal wear of contact surfaces of the wiper contact and/or resistive track at the point of the dithering, which in turn can change the resistance of the sender assembly circuit and result in erroneous level indications. In order to provide accurate liquid level readings and prolonged sender assembly life, it is desirable for a sender assembly to reduce or eliminate contact dither.

Prior art sender assemblies are known which rigidly constrain the movement of the contact assembly to minimize float-arm-induced contact distortion, however, these sender assemblies are subject to contact dither. Other prior art sender assemblies are known which utilize an external contact carrier to reduce contact dither, however, these sender assemblies are subject to float-arm-induced contact distortion. A need therefore exists, for a sender assembly which minimizes both float-arm-induced contact distortion and contact dither.

Prior art sender assemblies are also subject to pivot distortion which can interfere with the proper operation of the float arm. Pivot distortion is often caused when the attachment end of a metallic (e.g., wire) float arm is inserted directly into the pivot hub of a sender assembly. If the inserted portion of the float arm has any residual curvature (e.g., from the manufacturing process) which is forcibly straightened during insertion into the pivot hub, this results in a constant bending force applied to the inside of the hub. This bending force can cause the pivot hub to distort over time (especially if the hub is made from a plastic material), which can lead to binding of the pivot hub and abnormal operation. Alternately, the attachment ends of the pivot arms must be carefully manufactured to avoid any residual curvature, which can cause additional expense. A need therefore exists, for a sender assembly which is not subject to pivot distortion even if metallic float arms are used which have some residual curvature in the attachment end.

Since the ultimate application of a liquid level sender assembly is not always known prior to manufacture, it is desirable to provide a sender assembly adapted to allow connection of a float arm/float assembly at a later time to form a complete sensor. Also, it is desirable that the connection resist twisting moments caused by forces on the float. Further, while the connection should resist accidental detachment of the float arm, it is desirable that the float arm be easily removable (on purpose) if requirements change. Still further, it is desirable that the connection require a minimum of parts, labor and equipment for attachment and detachment.

Prior art sender assemblies are known which have a longitudinal hole in the pivot hub for inserting a portion of the float arm sized to produce a tight interference fit therein. Such assemblies resist twisting and accidental detachment but require equipment such as jigs and presses for attachment of the float arm to the pivot and do not allow the easy removal of the float arm if requirements change. Other prior art sender assemblies are known which have a longitudinal hole in the pivot hub for accepting a float arm and a snap-on attachment member on a pivot arm for securing the float arm. Such assemblies resist twisting and accidental detachment, and allow removal if requirements change, however, the insertion of the float arm into the pivot hub can lead to pivot distortion as previously discussed. Still other prior art sender assemblies utilize a connection having a shaft held by a set screw for attaching the float arm. Such assemblies allow easy removal of the float arm, but can allow twisting or accidental detachment if the set screw is not adequately tightened or vibrates loose. Further, use of a set screw involves extra parts, labor and tools to manufacture and install. A need therefore exists, for a sender assembly which is adapted to allow post-manufacture connection of a float arm/float assembly, which resists twisting moments caused by forces on the float, resists accidental detachment of the float arm, allows easy removal of the float arm, and requires a minimum of parts, labor and equipment for attachment and detachment.

SUMMARY OF THE INVENTION

In one aspect of the present invention, a liquid level sender is provided which has a housing that has a resistive track mounted thereto. Pivotably connected to the housing about a pivot axis are a pivot arm and a contact carrier. The pivot arm has a rotational force transmitting member and the contact carrier has a rotational force receiving member. The force transmitting member cooperates with the force receiving member such that only force components directed circumferentially about the pivot axis are transmitted to the contact carrier. A contact assembly is connected to the contact carrier, and is electrically cooperative with the resistive track to provide a variable resistor.

In a preferred embodiment, the force receiving member is a boss and the force transmitting member is two spaced apart surfaces on either side of the boss. Preferably, the distance between the spaced part surfaces is greater than the boss to provide play to avoid contact dither.

BRIEF DESCRIPTION OF THE DRAWINGS

A more complete understanding of the invention and its advantages will be apparent from the following detailed description when taken in conjunction with the accompanying drawings in which:

FIG. 3 is a perspective view of a second sender assembly according to the prior art;

FIG. 4 is a cross-sectional view of the prior art sender assembly of FIG. 3 taken through the bearing member;

FIG. 7 is a partial cross-sectional view of the sender assembly taken along line 7—7 of FIG. 6;

FIG. 8 is a partial cross-sectional view of the sender assembly taken along line 8—8 of FIG. 6 showing the rotational force transmitting means;

FIG. 9 is a perspective view of a pivot arm according to a preferred embodiment of the current invention.

DETAILED DESCRIPTION

Figure 1:
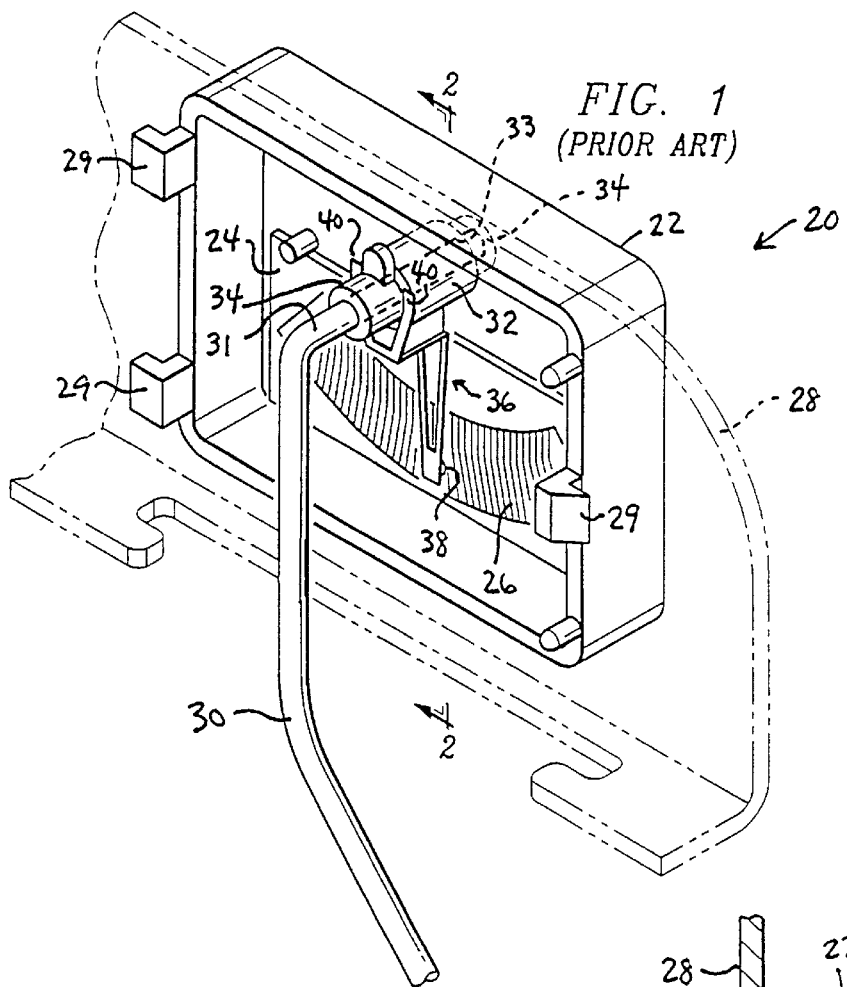
FIG. 1 is a perspective view of a first sender assembly according to the prior art.

Referring now to the drawings wherein like referenced characters designate like or corresponding parts throughout several views, a preferred embodiment of liquid level sender assembly of the present invention is illustrated. Further, selected sender assemblies according to the prior art are also illustrated.

Figure 2:
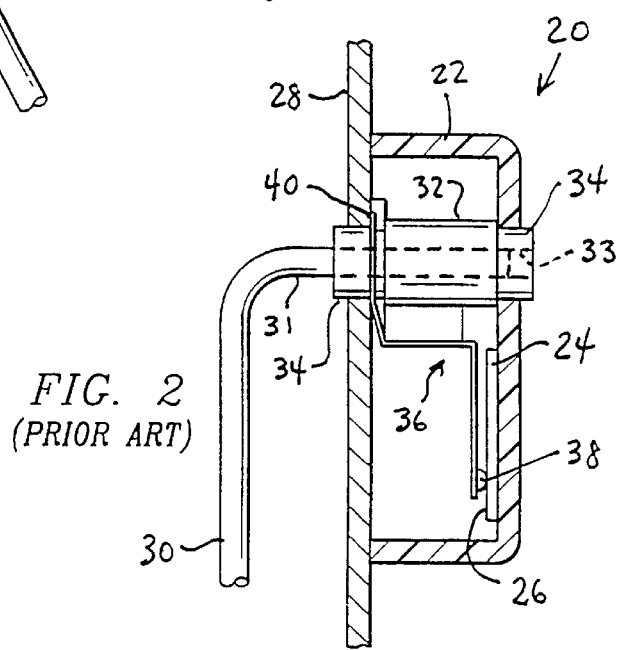
FIG. 2 is a cross-sectional view of the prior art sender assembly of FIG. 1 taken along line 2—2 of FIG. 1.

Referring first to FIGS. 1 and 2, a first type of liquid level sender assembly according to the prior art is shown. Prior art sender assembly 20 includes a rectangular case 22 within which is mounted a circuit card 24 having a resistive track 26 on one side. The case 22 is attached to a conductive base plate 28 (shown in phantom in FIG. 1) by means of hooks 29 to form an enclosure. A float arm 30 is rigidly connected to a pivot hub 32 with an interference fit between a shaft portion 31 of the float arm 30 and a passage 33 formed in the hub 32. Journals 34 which project from the longitudinal ends of the hub 32 pass through suitable holes in the case 22 and the base plate 28 to allow the float arm 30 to be pivotally mounted to the enclosure. A contact assembly 36 is mounted directly on the pivot hub 32 to move strictly in accordance with movement of the float arm 30. The contact assembly 36 is made of electrically conductive material having, at one end, a wiper contact 38 biased to maintain electrical contact with the resistive track 26, and further having, at another end, one or more ground contacts 40 biased to maintain electrical contact with the conductive base plate 28, thereby forming an electrical circuit having a resistance which corresponds with the angular position of the wiper contact 38 along the resistive track 26. External electrical connections (not shown) to the resistive track 26 and the conductive base plate 28 allow the resistance of this circuit to be sensed to provide an indication of the angular position of the float arm 30 with respect to the case 22.

Liquid level sender assemblies of the type shown in FIGS. 1 and 2 are subject to several disadvantages as previously discussed. For example, in the prior art sender assembly 20, the rigid connection between the float arm 30, the pivot bearing 32 and the contact assembly 36 makes such sender assemblies subject to contact dither which can produce excessive wear on the wiper contact 38 and/or the resistive track 26. Further, because the shaft portion 31 of the pivot arm 30 is inserted directly into the passage 33 of the pivot hub 32, the prior art sender assembly 20 is subject to pivot distortion if the shaft portion 31 has any residual curvature or other characteristics which can deform the hub 32 over time. Further, the interference fit attachment of the float arm 30 to the pivot hub 32 requires equipment such as jigs and presses for attachment of the float arm to the pivot hub and does not allow the easy removal of the float arm if requirements change.

Referring now to FIGS. 3 and 4, a second type of liquid level sender assembly according to the prior art is illustrated. Note that the float arm and contact carrier have been repositioned between FIGS. 3 and 4 for purposes of illustration. Prior art sender assembly 42 comprises a support arm 44 upon which is mounted a circuit card 46 having a resistive track 48 on one side. A bearing member 50 having a passage 52 formed therethrough is provided on the support arm 44 adjacent to the circuit card 46. A generally "J"-shaped contact carrier 54 having a long arm 62 and a short arm 66 is pivotally attached to the support arm 44 using a pivot pin 56 having a shaft 58 which passes sequentially through a first passage 60 through the long arm 62, the passage 52 of the bearing member 50, and a second passage 64 through the short arm 66. The pivot pin 56 is held in place by a head 68 formed at one end and a retaining clip 70 attached at the other end. The length of the pivot pin shaft 58 between the head 68 and the retaining clip 70 is longer than the distance between the outer ends of contact carrier passages 60 and 64, thereby providing end clearance (shown in FIG. 4 and denoted using reference numeral 72) which allows for longitudinal movement of the pivot pin 56 with respect to the bearing member 50. In addition, the diameter of the pivot pin shaft 58 is less than the diameter of the bearing member passage 52 thereby providing radial clearance (shown in FIG. 4 and denoted using reference number 74) thereby allowing radial movement of the contact carrier with respect to the pivot bearing 50. A contact assembly 76 is mounted directly on the contact carrier long arm 62 to move strictly in accordance with movement of the contact carrier 54. The contact assembly 76 is made of electrically conductive material having, at one end, a wiper contact 78 biased to maintain electrical contact with the resistive track 48, and further having, at another end, a ground contact 80 biased to maintain electrical contact with a conductive cap 82 fixedly mounted on the end of the bearing member 50. This forms an electrical circuit having a resistance which corresponds with the angular position of the wiper contact 78 along the resistive track 48. External electrical connections (not shown) to the resistive track 48 and the conductive cap 82 allow the resistance of this circuit to be sensed to provide an indication of the angular position of the contact carrier 54 with respect to the support arm 44.

In the prior art sender assembly 42, as contrasted with the prior art sender assembly 20, the contact carrier 54 is not directly connected to a float arm which moves in accordance with the liquid level to be measured. Instead, in prior art sender assembly 42, a separate float arm 84 is provided. The float arm 84 has a first end which passes through a transversely oriented (i.e., perpendicular to the pivot axis) hole in the pivot pin head 68 and is held in place using a set screw 86 threadedly mounted in an intersecting hole in the pivot pin head. This connection allows the float arm 84 to pivot about the same axis as the contact carrier 54, namely, the longitudinal axis of the pivot pin 56. A float (not shown) can be mounted on the remote end of the float arm 84 to move in accordance with the level of liquid in the tank.

While the float arm 84 and the contact carrier 54 both pivot about the pivot pin 56, no significant rotational force is transmitted between the float arm 84 and the contact carrier 54 by means of the pivot pin 56. Instead, the movement of the float arm 84 is transmitted to the contact carrier 54 by means of a rotational force receiving member 88 formed on the contact carrier long arm 62. The rotational force receiving member 88 includes at least two transverse portions 90 which traverse the plane of rotation of the float arm 84 about the pivot pin 56 and which are angularly spaced apart with respect to the pivot axis on each side of the pivot arm 84. The distance between the transverse portions 90 (best seen in FIG. 3 and denoted using reference numeral 92) is greater than the thickness of the float arm 84 in that region, thereby allowing the float arm 84 a limited range of angular movement (shown in FIG. 3 and denoted using reference numeral 94) through which the float arm can move without touching the contact carrier 54. Of course, when the float arm 84 moves in one direction beyond the range provided by the distance 92 between the transverse members 90, then the float arm will touch the transverse member and transmit rotational force to the contact carrier 54, causing it to rotate along with the float arm 84. When the float arm 84 begins to travel in the opposite direction, the contact carrier 54 will not follow the movement until the float arm reaches the opposite transverse member 90. This "lag" between the reversal of movement of the float arm 84 and the reversal of movement of the contact carrier 54, also known as mechanical hysteresis, is intended to reduce dither of the wiper contact 78 on the resistive track 48.

While prior art liquid level sender assemblies of the type shown in FIGS. 3 and 4 may reduce contact dither, such sender assemblies are subject to several other disadvantages as previously discussed. First, such assemblies are subject to float-arm-induced contact distortion. As best seen in FIG. 4, out-of-plane forces (i.e., those not directed in the plane of rotation of the float arm 84 about the pivot pin 56) applied to the float arm 84 of sender assembly 42 are transmitted via the pivot pin 56 to the contact carrier 54 and, hence, to the contact assembly 76. For example, when the float arm 84 is subjected to forces directed perpendicular to the pivot axis, the pivot pin 56 moves within the passage 52 due to clearances 72 and 74 (as illustrated by the dotted line showing in FIG. 4) through a range of angular motion as denoted with reference numeral 96. This, in turn, causes the contact assembly 76, which is attached to the contact carrier 54, to distort such that the contact force between the wiper contact 78 and the resistive track 48 changes and such that the wiper contact moves radially across the resistive track (as illustrated by another dotted line showing in FIG. 4) through a range of motion denoted by reference numeral 98. The change in contact force between the wiper contact 78 and the resistive track 48 changes the resistance output of the sender assembly circuit even if there is no change in the wiper contact position, thus leading to inaccurate level readings.

Since the float arm 84 is connected to the pivot pin 56 using set screw 86, the sender assembly 42 allows easy attachment and removal of the float arm, albeit requiring appropriate tools. However, twisting of the float arm or accidental detachment is possible if the set screw is not adequately tightened or vibrates loose, a definite possibility if the sender assembly is used in a high vibration environment such as a motor vehicle.

Figure 5:
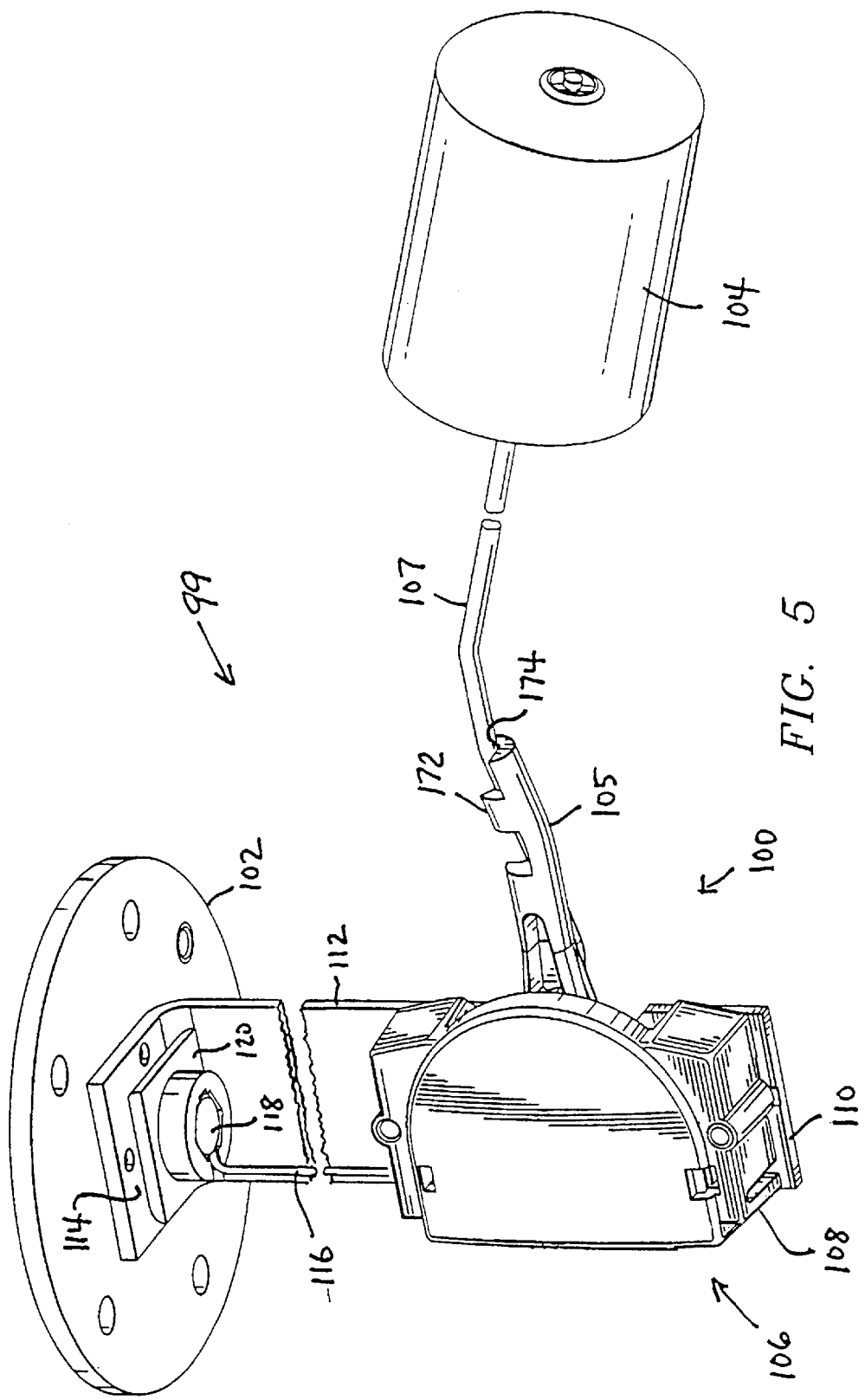
FIG. 5 is a perspective view of a liquid level sensor incorporating a sender assembly according to a preferred embodiment of the present invention.

Referring now to FIGS. 5–10, a preferred embodiment of the current invention will be described. Shown in FIG. 5 is a liquid level sensor 99 including a sender assembly 100, a mounting flange 102, and a float 104. The sender assembly 100 includes a housing 106 attached to the mounting flange 102 for positioning the sender assembly within a vehicle fuel tank. A pivot arm 105 extends from the housing 106 for attachment of the float 104 by means of a float arm 107.

In the preferred embodiment, the housing 106 comprises a case 108 having a generally concave portion which is joined to a base plate 110 to form an enclosure for mounting the internal components. The base plate 110 has an upper portion 112 which extends past the case 108 and connects to the mounting flange 102 with angle bracket 114. It will be readily apparent that the length and or configuration of the upper portion 112 can be selected for positioning the sender assembly 100 at the desired location within the tank.

In the preferred embodiment, the base plate 110 is formed from a metal such as aluminum, brass, or steel, thereby providing a first electrically conductive path between the sender assembly 100 and the mounting flange 102. A wire 116 or other electrical conductor can be provided to form a second electrical path between the sender assembly 100 and the mounting flange 102. In the preferred embodiment, the mounting flange 102 is formed from metal and is placed in electrical contact with the angle bracket 114 of the base plate 110. A hole formed through the mounting flange 102 receives a conductive bolt 118 which is electrically insulated from the flange 102 and base plate 110 by insulator assembly 120. The wire 116 is electrically connected to the bolt 118. This arrangement allows two electrically conductive paths to the sender assembly 100 to be accessed from the top of the mounting flange 102 by making electrical connections (not shown) to the top of the flange 102 and to the top of the conductive bolt 118.

Figure 6:
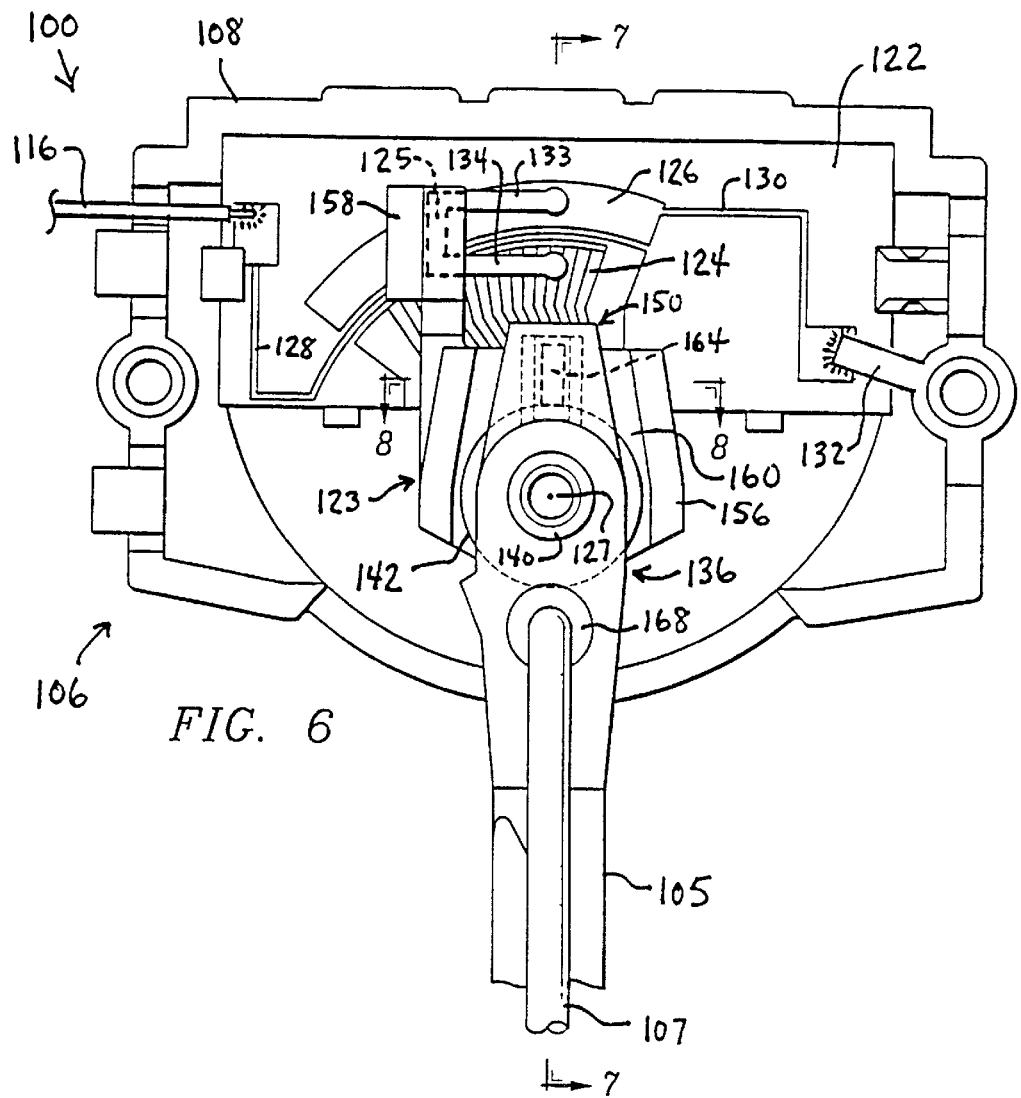
FIG. 6 is a rear view of the sender assembly of FIG. 5 with the base plate removed to show interior components.

Referring now also to FIGS. 6–10, the components and structure of the sender assembly 100 will be further described. Referring specifically to FIG. 6, the sender assembly 100 is shown with the base plate 110 removed to reveal internal components including a circuit card 122, the pivot arm 105, a contact carrier 123, and a contact assembly 125. The circuit card 122 includes a resistive track 124 and is mounted within the housing 106, preferably by attachment to the inside of the case 108. As will be further described herein, the pivot arm 105 and the contact carrier 123 are both pivotally mounted to the housing 106 for rotation about a common pivot axis 127 (best seen in FIG. 7). The contact assembly 125 is mounted on the contact carrier 123 at a radial distance from the pivot axis 127, and thus moves circumferentially about axis 127 when the contact carrier is pivoted. As is known in the art, the circuit card 122 is made of an insulating material, for example, printed circuit board or alumina, on which the resistive track 124 has been formed through the deposition of electrically resistive materials, for example, resistive inks or cermet. The resistive track 124 is formed in the shape of an arc about pivot axis 127 at approximately the same radial distance from the pivot axis as contact assembly 125. As will be further described herein, a portion of the contact assembly 125 is biased to maintain contact with the resistive track 124 as the contact carrier 123 is pivoted. In the preferred embodiment shown, the resistive track 124 comprises a series of discrete resistors arrayed for sequential connection to the contact assembly 125; however, it will be readily appreciated that alternative embodiments in which the resistive track 124 is a single continuous resistor are within the scope of the current invention.

The circuit card 122 can also include one or more conductive tracks or other conductive areas to provide electrical connections to the resistive track 124 and/or other components of the circuit. For example, the circuit card 122 of the preferred embodiment includes a conductive track 126, also known as a collector, formed in an arc concentric with the resistive track 124, a first conductive lead 128 connecting the resistive track to the external wire 116, and a second conductive lead 130 connecting the conductive track to the conductive base plate 110 by means of a ground strap 132. In this preferred embodiment, the contact assembly 125 includes first and second contact fingers 133 and 134, respectively, which are electrically connected to one another and which are biased to maintain electrical contact with the conductive and resistive tracks 126 and 124, respectively, thereby completing an electrical circuit having a resistance which varies as the contact carrier 123 is pivoted. It will be appreciated that, while the use of a conductive track 126 on the circuit card 122 is preferred, circuit cards using other electrical configurations known in the art can be used without departing from the scope of the current invention.

The sender assembly 100 of the current invention utilizes an innovative arrangement of the pivot arm and the contact carrier to address the problems of contact dither and float-arm-inducted contact distortion which affected prior art sender assemblies. As best seen in FIGS. 7 and 9, the pivot arm 105 comprises a lower portion 135 adapted for attachment of the float arm 107 and an upper portion 136 adapted for pivotally mounting the float arm to the housing 106. In the preferred embodiment, the pivot arm 105 is a one-piece molded plastic article which allows complex surface features to be provided without requiring extensive machining or finishing of the part. To pivotally mount the pivot arm 105 to the housing 106, generally cylindrical front and rear journals 138 and 140, respectively, extend from the upper portion 136 and, as best seen in FIG. 7, are received in front and rear bearings 142 and 144, respectively, provided on the case 108 and base plate 110. In the preferred embodiment, the bearings 142 and 144 include both radial bearing surfaces 146 (oriented generally parallel to the pivot axis 127) and thrust (i.e., axial) bearing surfaces 148 (oriented generally perpendicular to the pivot axis 127) completely constraining the motion of the pivot arm 105 and preventing any motion of the pivot arm other than rotation about the pivot axis 127. In a more preferred embodiment, at least one of the bearings 142 and/or 144 is a discrete metallic article inserted into the housing 106. The use of metallic material for the bearings 142 and/or 144 is especially desirable because of the good strength, wear resistance, chemical and thermal stability provided by metals.

The pivot arm 105 further comprises a rotational force transmitting member 150 formed on the upper portion 136 and adapted to transmit rotational force to the contact carrier 123. In the preferred embodiment, the force transmitting member 150 comprises two spaced-apart members 152 defining a slot 154 therebetween having a first width (denoted by reference letter w, in FIG. 8). The rotational force transmitting member 150 is adapted to cooperate with a rotational force receiving member on the contact carrier 123 as is further described herein.

Figure 10:
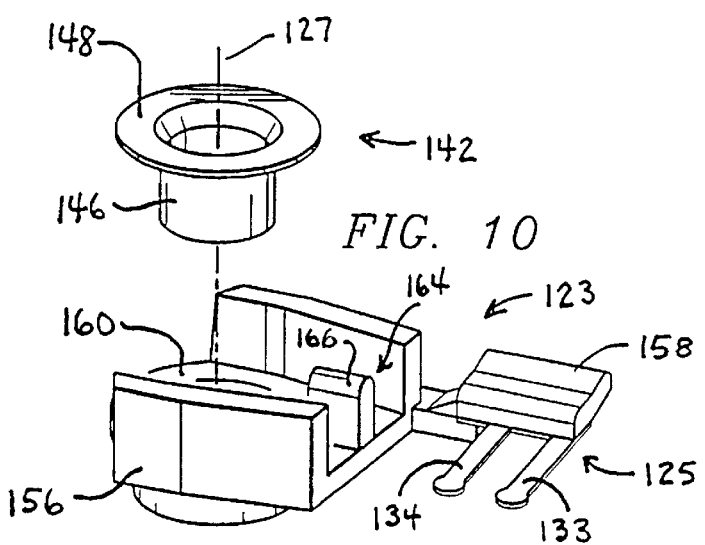
FIG. 10 is a perspective view of a contact carrier and a pivot bearing according to a preferred embodiment of the current invention.

As best seen in FIGS. 6, 7, and 10, the contact carrier 123 comprises a hub member 156 adapted for pivotally mounting the contact carrier to the housing 106, and an arm member 158 adapted to support the contact assembly 125. As best seen in FIG. 10, in the preferred embodiment the contact carrier 123 is a one-piece molded plastic article which allows the formation of complex surface features with minimal additional machining or finishing. To pivotally mount the contact carrier 123 to the housing 106, the contact carrier of the preferred embodiment has a circular hole formed through the hub member 156 to define an annular portion 160. The annular portion 160 encircles a hollow cylindrical boss 162 projecting from the inside of the case 108, centered around the pivot axis 127. This constrains the contact carrier 123 to pivot about the pivot axis. The radial portion 146 of the front bearing 142 (which supports the front journal 138 of the pivot arm 105) is sized to fit within the bore of the cylindrical boss 162, and the thrust portion 148 of the front bearing extend radially beyond the boss 162. When the bearing 142 is inserted into the boss 162 until the thrust portion 148 seats against the rear face of the boss 162, this captures the contact carrier and controls the insertion depth of the bearing 142 into the case 108 very accurately. The annular portion 160 of the contact carrier 123 can thus be captured between the case 108, the boss 162, and the forward side of the thrust portion 148 of the forward bearing 142, completely constraining the motion of the contact carrier and thereby preventing any motion other than rotation about the pivot axis 127. Further, the interposition of the forward bearing 142 and the boss 162 between the front journal 138 of the pivot arm 105 and the hub member 156 of the contact carrier 123 eliminates the transmission of any out-of-plane forces from the pivot arm to the contact carrier which could cause contact distortion.

In the preferred embodiment, the height of the cylindrical boss 162, measured from the seating surface of the contact carrier 123 in a direction parallel to pivot axis 127, is greater than the height (again measured from the seating surface of the contact carrier 123 in a direction parallel to pivot axis 127) of those portions of the contact carrier which are axially adjacent to the thrust portion 148 of the front bearing 142. This results in a small gap between the contact carrier 123 and its seat and/or the front face of the thrust portion 148 of the front bearing 142. In such case, when the front bearing 142 is seated forward against the cylindrical boss 162, the contact carrier 123 is constrained by the thrust portion 148 of the front bearing against movement in the rearward direction, but the front bearing does not exert any compressive force on the contact carrier that could restrict its rotation or cause contact distortion.

As best seen in FIGS. 6–9, the contact carrier 123 further comprises a rotational force receiving member 164 formed on the hub member 156 and adapted to receive rotational force from the rotational force transmitting member 150 of the pivot arm 105. In the preferred embodiment, the rotational force receiving member 164 comprises a boss 166 which projects from the hub member 156 into the slot 154 of the rotational force transmitting member 150. The boss 166 has a second width (denoted by reference letter $W_2$ in FIG. 8) which is less than the width $w_1$ of the slot 154. The difference between the width $w_1$ of the slot 154 of the rotational force transmitting member 150 and the width $W_2$ of the rotational force receiving member 164 creates a mechanical hysteresis between the pivot arm 105 and the contact carrier 123 when the direction of rotation is reversed, thus eliminating contact dither caused by small oscillations of the pivot arm.

During assembly of the preferred embodiment of the sender assembly 100, the contact carrier 123 is first inserted onto the cylindrical boss 162 of the case 108 (i.e., such that the cylindrical boss is encircled by the annular portion 160 of the contact carrier) and moved forward until seated. Next, the radial portion 146 of the front bearing 142 is inserted into the bore of the cylindrical boss 162 and moved forward until the front face of the thrust portion 148 of the front bearing is seated against the rear face of the cylindrical boss. Preferably, the radial portion 146 of the front bearing 142 has an interference fit with the inner surface of the walls of the cylindrical boss 162. The contact carrier is now free to rotate about the pivot axis 127, but it is constrained from significant axial movement (i.e., parallel to pivot axis 127) by the front side of the thrust portion 148 of the front bearing 142. Next, the front journal 138 of the pivot arm 105 is inserted into the bore of the front bearing 142 and the pivot arm is moved forward until the pivot arm is seated against the rear side of the thrust portion 148 of the front bearing 142, while simultaneously operably engaging the rotational force receiving member 164 with the rotational force transmitting member 150. Finally, the rear journal 140 of the pivot arm 105 can be inserted into a rear bearing 144 positioned along the pivot axis 127 to allow rotation about the pivot axis.

The pivot arm 105 of the current invention includes additional features which address the problems of pivot hub distortion and post-manufacture float arm attachment experienced by prior art sender assemblies. As best seen in FIGS. 7 and 9, the pivot arm 105 includes a float arm attachment hole 168 having a longitudinal axis 169 which is parallel to, but radially offset from, the pivot axis 127. Since the attachment end 170 of the float arm 107 is thus isolated from the pivoting portions (i.e., journals 138 and 140) of the pivot arm, any residual curvature in the attachment end 170 cannot cause pivot distortion in the sender assembly. To provide for simple post-manufacture attachment of the float arm 107 to the pivot arm 105, a plurality of snap members 172 are provided on the lower portion 135 of the pivot arm 105. The snap members 172 are positioned in a staggered arrangement along a float arm channel 174. In the preferred embodiment shown in FIG. 9, the snap features 172 are deformable, through the application of an external force (e.g., as the user presses the wire float arm towards the float arm channel 174) from a first configuration to a second configuration to allow positioning of the float arm 107 in the float arm channel 174. In the absence of an external force (e.g., when the float arm 107 has been inserted into the float arm channel 174) the snap members 172 return to the first configuration by virtue of the natural elastic characteristics of the snap material such that the float arm is retained in the float arm channel. It will be readily apparent that other configurations of snap members known in the art could be used on the float arm 105 as part of the float arm connection means without departing from the scope of the current invention. The combination of the radially offset float arm attachment hole 168 and the snap members 172 provides a pivot arm 105 which is adapted to allow for post-manufacture connection of a float arm 107, which resists twisting moments caused by forces on the float (by virtue of the angled attachment end 170 being inserted into the attachment hole 168), which resists accidental detachment of the float arm even under high vibration conditions (by virtue of the snap connections 172), which allows for easy installation or removal of the float arm (by merely inserting the attachment end 170 into the attachment hole 168 and then snapping the arm 107 into the snap members 172, or the reverse for removal) and which requires a minimum number of parts (only the float arm 107 and the one-piece molded arm 105 are required).

Thus, there is disclosed a liquid level sender assembly that overcomes the shortcomings and disadvantages of the prior art liquid level sender assemblies. While the foregoing embodiments of the invention have been disclosed with reference to a specific sender assembly structure, it is to be understood that many changes in detail may be made as a matter of design choices, without departing from the spirit and scope of the invention, as defined by the appended claims.

What is claimed is:

1. A liquid level sender assembly comprising:
a housing;
a resistive track mounted to said housing;
a pivot arm pivotally connected to said housing for rotation about a pivot axis and having a rotational force transmitting member;
a contact carrier pivotally connected to said housing for rotation about said pivot axis and having a rotational force receiving member and a contact assembly, said contact carrier, except for said rotational force receiving member, being isolated from touching said pivot arm;
said rotational force receiving member cooperating with said rotational force transmitting member to receive from said pivot arm only force components directed circumferentially about said pivot axis;
said rotational force transmitting member and said rotational force receiving member dimensioned such that there is a predetermined arc of travel of said rotational force transmitting member which does not result in contact between said rotational force transmitting member and said rotational force receiving member and;
said contact assembly electrically cooperating with said resistive track to generate a variable resistance, said variable resistance varying according to an angular position between said housing and said contact carrier.

2. A liquid level sender assembly according to claim 1, wherein one of said rotational force transmitting member and said rotational force receiving member comprises two spaced-apart surfaces defining a slot having a first width and the other of said rotational force transmitting member and said rotational force receiving member comprises a boss having a second width positioned within said slot, both said widths being measured in a circumferential direction relative to said pivot axis wherein said second width is less than said first width.

3. A liquid level sender assembly according to claim 1, wherein said housing includes two bearings and said pivot arm includes journal portions extending from each side thereof into said bearings.

4. A liquid level sender assembly according to claim 3, wherein at least one of said bearings is a discrete metallic article inserted into said housing.

5. A liquid level sender assembly according to claim 4, wherein said bearing which is a discrete metallic article includes a radial portion and an axial portion, said radial portion being oriented generally parallel to the pivot axis and said axial portion being oriented generally perpendicular to said pivot axis.

6. A liquid level sender assembly according to claim 1, wherein said pivot arm further comprises float arm connection means.

7. A liquid level sender assembly according to claim 6, wherein said float arm connection means comprise:

a float arm attachment passage formed in said pivot arm parallel to, but radially offset from, said pivot axis, said float arm attachment passage being adapted to receive therein one end of a float arm.

8. A liquid level sender assembly according to claim 7, wherein said float arm connection means further comprise:

a plurality of snap members which, through the application of an external force, are deformable from a first configuration to a second configuration to allow positioning of a float arm in a float arm channel, and which, in the absence of said external force, return to said first configuration such that said float arm is retained in said float arm channel.

9. A liquid level sender assembly according to claim 6, wherein said float arm connection means comprise a float arm attachment passage formed in said pivot arm along said pivot axis, said float arm connection passage being adapted to receive therein one end of a float arm.

10. A liquid level sender assembly according to claim 6, wherein said float arm connection means comprise a plurality of snap members which, through the application of an external force, are deformable from a first configuration to a second configuration to allow positioning of a float arm in a float arm channel and which, in the absence of said external force, return to said first configuration such that said float arm is retained in said float arm channel.

11. A liquid level sender assembly comprising:

a housing defining an annular boss about a pivot axis and having inside and outside surfaces;

a resistive track mounted to said housing;

a pivot arm pivotally mounted for rotation about the said pivot axis and having a portion thereof rotationally associated with either said inside surface or said outside surface of said annular boss and having a rotational force transmitting member;

a contact carrier pivotally mounted for rotation about said pivot axis and having a portion thereof rotationally associated with the side of said annular boss opposite the side of said annular boss rotationally associated with said pivot arm, said contact carrier having a rotational force receiving member and a contact assembly, said contact carrier, except for said rotational force receiving member, being isolated from touching said pivot arm;

said rotational force receiving member cooperating with said rotational force transmitting member to receive from said pivot arm only force components directed circumferentially about said pivot axis;

said contact assembly electrically cooperating with said resistive track to generate a variable resistance, said variable resistance varying according to an angular position between said housing and said contact carrier.

12. A liquid level sender assembly according to claim 11, wherein one of said rotational force transmitting member and said rotational force receiving member comprises two spaced-apart surfaces defining a slot having a first width and the other of said rotational force transmitting member and said rotational force receiving member comprises a boss having a second width positioned within said slot, both said widths being measured in a circumferential direction relative to said pivot axis.

13. A liquid level sender assembly according to claim 12, wherein said second width is less than said first width.

14. A liquid level sender assembly according to claim 11, wherein said housing includes a bearing interposed between said pivot arm and the surface of said annular boss to which it is rotationally associated.

15. A liquid level sender assembly according to claim 14, wherein said pivot arm is rotationally associated with the inside surface of said annular boss and said contact carrier is rotationally associated with said outside surface of said boss.

16. A liquid level sender assembly according to claim 15, wherein said bearing which is a discrete metallic article includes a radial portion and an axial portion, said radial portion being oriented generally parallel to the pivot axis and said axial portion being oriented generally perpendicular to said pivot axis.

17. A liquid level sender assembly according to claim 11, wherein said pivot arm further comprises float arm connection means.

18. A liquid level sender assembly according to claim 17, wherein said float arm connection means comprise:

a float arm attachment passage formed in said pivot arm parallel to, but radially offset from, said pivot axis, said float arm attachment passage being adapted to receive therein one end of a float arm.

19. A liquid level sender assembly according to claim 18, wherein said float arm connection means further comprise:

a plurality of snap members which, through the application of an external force, are deformable from a first configuration to a second configuration to allow positioning of a float arm in a float arm channel, and which in the absence of said external force, return to said first configuration such that said float arm is retained in said float arm channel.

20. A liquid level sender assembly according to claim 17, wherein said float arm connection means comprise a float arm attachment passage formed in said pivot arm along said pivot axis, said float arm connection passage being adapted to receive therein one end of a float arm.

21. A liquid level sender assembly according to claim 17, wherein said float arm connection means comprise a plurality of snap members which, through the application of an external force, are deformable from a first configuration to a second configuration to allow positioning of a float arm in a float arm channel and which, in the absence of said external force, return to said first configuration such that said float arm is retained in said float arm channel.

* * * * *